United States Patent [19]

Ogata

[11] Patent Number: 5,767,694
[45] Date of Patent: Jun. 16, 1998

[54] INFORMATION PROCESSING APPARATUS WITH A MODE SETTING CIRCUIT

[75] Inventor: Yukihisa Ogata, Tokyo, Japan

[73] Assignee: NEC Corporation, Tokyo, Japan

[21] Appl. No.: 580,169

[22] Filed: Dec. 28, 1995

[30] Foreign Application Priority Data

Dec. 28, 1994 [JP] Japan .................................. 6-327228

[51] Int. Cl.⁶ .............................. H03K 19/00; G05B 9/02
[52] U.S. Cl. .............................. 326/16; 327/198; 364/186; 371/22.1
[58] Field of Search ............................... 326/16; 327/198, 327/545; 364/186; 365/201; 371/22.1, 22.5

[56] References Cited

U.S. PATENT DOCUMENTS

| | | | |
|---|---|---|---|
| 5,142,688 | 8/1992 | Harwood, III | 395/800 |
| 5,291,425 | 3/1994 | Nagaishi | 371/22.5 X |
| 5,373,472 | 12/1994 | Ohsawa | 365/201 |
| 5,557,232 | 9/1996 | Shimogawa | 327/545 |
| 5,559,744 | 9/1996 | Kuriyama et al. | 365/201 |

FOREIGN PATENT DOCUMENTS

| 0 556 826 | 8/1993 | European Pat. Off. . |
|---|---|---|
| 2-16473 | 1/1990 | Japan . |

*Primary Examiner*—Jon Santamauro
*Attorney, Agent, or Firm*—Foley & Lardner

[57] ABSTRACT

An information processing apparatus including a mode setting circuit which comprises a setting means for setting a test operate mode at power on, a means for checking a read-data from an input port in the test operate mode, means of maintaining the test operate mode in cases where the read-data is in agreement with a reference data and switching the test operate mode to a user operate mode in cases where the read-data is not in agreement with a reference data.

3 Claims, 6 Drawing Sheets

5,767,694

1

INFORMATION PROCESSING APPARATUS WITH A MODE SETTING CIRCUIT

BACKGROUND OF THE INVENTION

The present invention relates to an information processing apparatus, and more particularly to an information processing apparatus with a mode setting circuit.

An information processing apparatus has a user operate mode and a test operate mode. The test operate mode is a mode for checking whether movement and function of the information processing apparatus is normal. Accordingly, when the information processing apparatus is used in a user operate mode, the information processing apparatus may not change from the user operate mode to the test operate mode.

The information processing apparatus has a mode setting circuit for selecting one of the user operate mode and the test operate mode. The mode setting circuit has a mode setting terminal for setting a mode of the information processing apparatus.

The mode setting circuit of the prior art is illustrated in FIGS. 1, 2 and 3. FIG. 1 is a view illustrative of a mode setting circuit 100 with a mode setting terminal. The circuit 100 comprises a power-on clear circuit 1, a power source terminal 21 for supplying the power- on clear circuit 1, a mode setting terminal 22 inputing a mode setting input signal, an inverter 31 constructed with a p-channel transistor 23 and an n-channel transistor 24 and a flip-flop 25 inputing the output of the power-on clear circuit 1 and the inverter 31 and outputing a mode setting signal 51. The mode setting circuit 100 is set to the test operate mode or the user operate mode by the level of the mode setting input signal applied at the mode setting terminal 22 when a power source is produced at the power source terminal 21.

FIG. 2 is a circuit diagram illustrative of a mode setting circuit 100 where the mode setting terminal is shared with an input terminal 21. The input terminal 21 is inputed at a voltage higher than the power supply voltage in the user operate mode when the information processing apparatus operates in the test operate mode. The voltage higher than the power supply at the test mode is applied at the input terminal 21 and raises the voltage level of node "A". When the voltage level of node "A" exceeds the threshold value of an inverter 36, the mode setting signal 51 which has a level for selecting the test mode is outputted through an inventor.

FIG. 3 is a circuit diagram illustrative of a mode setting circuit 100 shown in Japanese Unexamined Patent Application Disclosure HEI 2-16473. A counter 42 comprising flip-flops 43,44 and 45 and a latch circuit 46 are reset when the input signal 50 is Hi-level. Then, the output Q of the flip-flop 45 is reset to Lo-level and a transfer gate 47 is opened. The level of the mode setting input signal at the mode setting terminal 22 is latched by the latch circuit 46. Next, the input signal 50 changes to Lo-level. The counter 42 counts up by the clock signal CLK and the latch circuit 46 transmits the level of the mode setting input signal to the mode setting signal 51. The counter 42 counts up, and the counter 42 outputs Hi-level. The gate 47 is closed by Hi-level of the output of the counter 42.

The above-described mode setting circuits have a mode setting terminal 22 which receives a mode setting signal and a power supply signal. Accordingly, it is a problem that the mode setting circuits can be set to an unexpected mode by a noise applied to the mode setting terminal 22 by the power supply. The mode setting circuit shown in FIG. 3 reduces the influence of the noise by limiting the period transmitting the mode setting input signal. As far as the mode setting circuit

2 is connected to the mode setting terminal, however, the mode may be changed unexpectedly by noise on the power supply.

SUMMARY OF THE INVENTION

It is an object of the present invention to provide an information processing apparatus with a mode setting circuit for setting mode without a mode setting terminal.

The information processing apparatus of the present invention comprises a mode setting circuit for providing a test mode at power-on and for determining whether the test operate mode is maintained or switched to a user operate mode after the test mode is set.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE PREFERRED EMBODIMENTS

Figure 1:
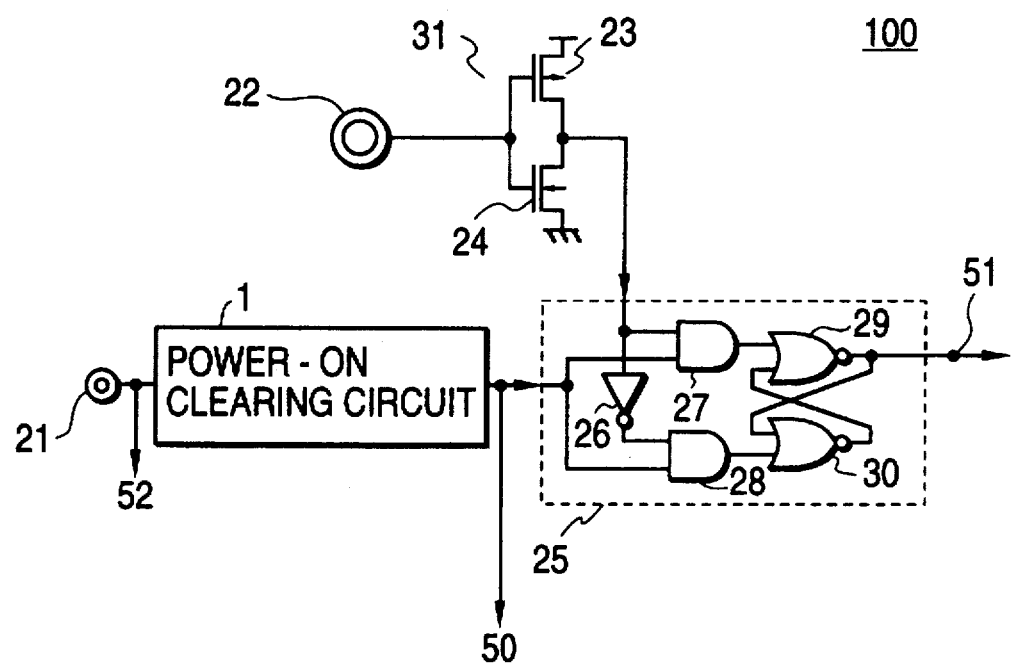
FIG. 1 is a circuit diagram illustrative of a first embodiment of the prior art mode setting circuit.
Figure 2:
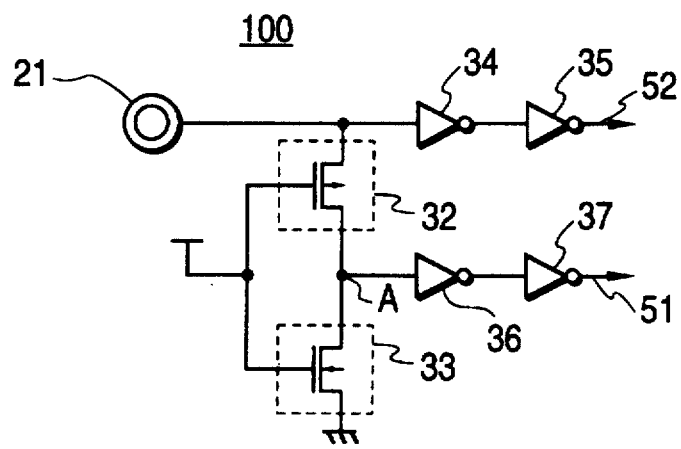
FIG. 2 is a circuit diagram illustrative of a second embodiment of the prior art mode setting circuit.
Figure 3:
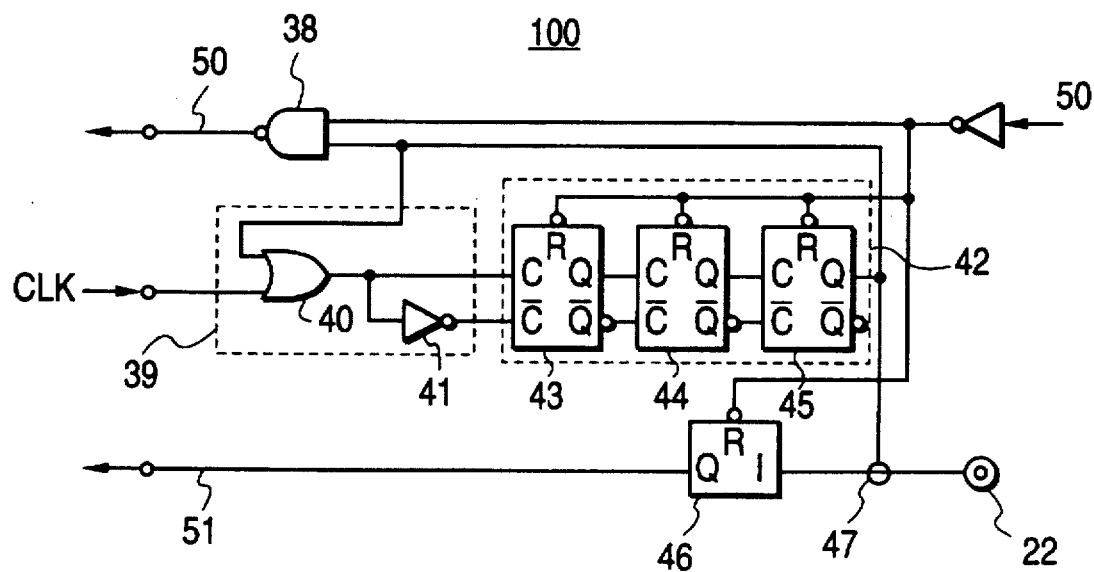
FIG. 3 is a circuit diagram illustrative of a third embodiment of the prior art mode setting circuit.
Figure 4:
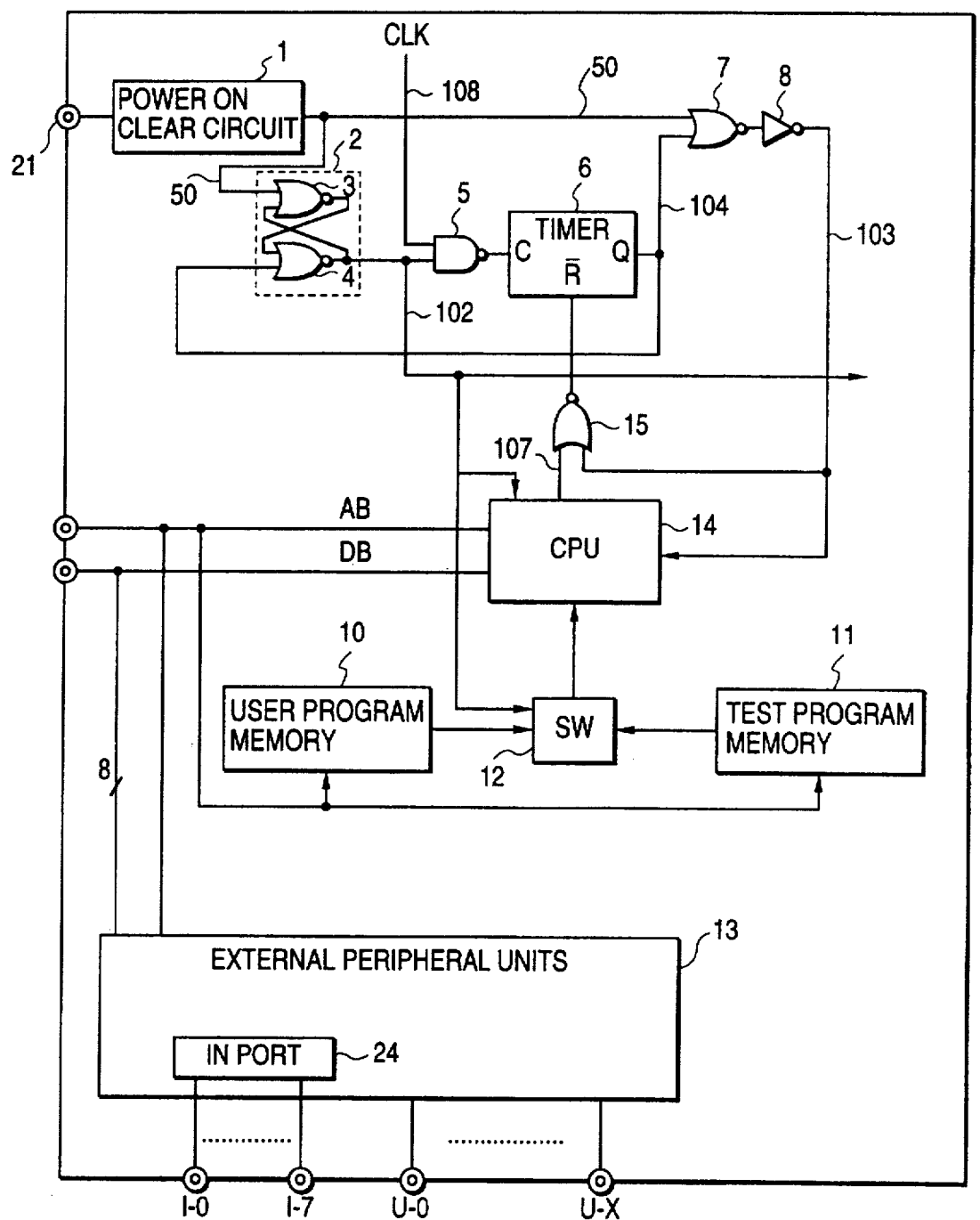
FIG. 4 is a circuit diagram illustrative of an information processing apparatus according to a first embodiment of the present invention.

Referring now to FIG. 4, description will be made of an information processing apparatus according to the first embodiment of the present invention. This apparatus 200 comprises of an integrated circuit(IC). The apparatus 200 is comprised of a power on clear circuit 1 for outputing an initializing signal 50 to initialize interior circuits at power-on, a flip-flop 2 which is constructed with NOR circuits 3,4 and is set at power-on to output a test operate mode signal 102 and is reset when the test operate mode is canceled, a NAND circuit 5 inputing a clock signal CLK and the test operate mode signal 102, a timer 6 set by an output of NAND circuit 5 and which operates only during the period of time when the process is in the test mode and outputs an overflow signal 104 to cancel the test operate mode in the absence of a test mode maintenance request signal 107 over a predetermined period of time, a NOR circuit 7 inputing the intializing signal 50 and the overflow signal 104, an inventer 8 inputing the output of NOR circuit 7 and outputing an internal resetting signal 103, a user program memory 10 for storing a program for use at the user operate mode, a test program memory 11 for storing programs for use at the test operate mode testing of the information processing apparatus, a switch 12 selecting the user program memory 10 and the test program memory 11 by the test mode operate signal 102, a CPU 14 which operates under the control of the program stored in the selected memory and judging whether a reference data set stored in the test program memory 11 and a read data are in agreement and outputing the test operate mode maintenance request signal 107 when the read data and the reference data are not in agreement, and, external peripheral units 13 including an input port 14 connected to input terminals I-0 through I-7 for inputing the read data from the input terminals and outputing the read data via data bus DB to the CPU 14.

Figure 5:
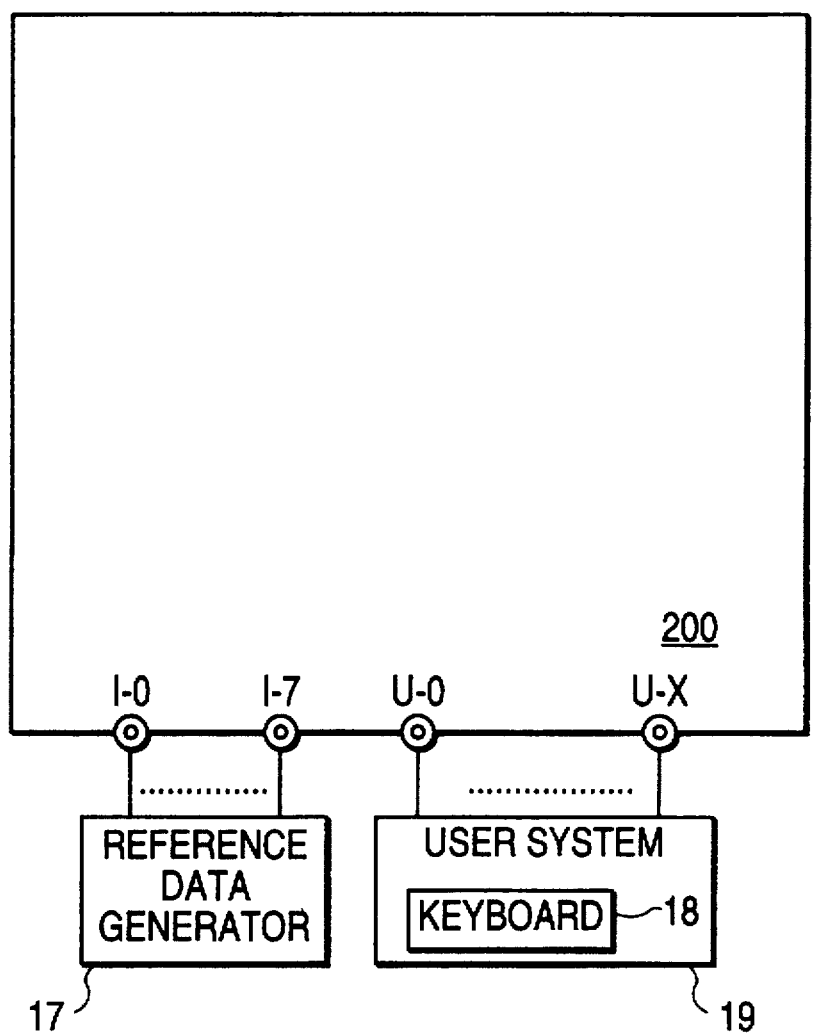
FIG. 5 is a circuit diagram illustrative of an information processing apparatus using at test operate mode according to a first embodiment of the present invention.

FIG. 5 is a circuit diagram illustrative of an information processing apparatus operating in test operate mode. The input terminals I-0 through I-7 of the information processing apparatus 200 are connected to a reference data generator 7 and input the reference data generated in reference data generator 7. The reference data generator indicates the read data as being the same as the reference data when the test operate mode continues and does not indicate the read data as being the same as the reference data when the test opetate mode does not continue. The I/O ports u-0 through u-7 are connected to user system 19 including a keyboard 18.

The operation of the present embodiment will now be explained. First, the power on clear circuit 1 outputs the initializing signal 50 when the power source is supplied to the power source terminal 21. The internal resetting signal 103 is outputed through the NOR circuit 7 and the invertor 8 because the overflow signal 104 is not outputed from the timer 6, and the internal circuits are reset. This internal resetting signal 103 is inputed to the timer 6 via the NOR circuit 15 to reset the timer 6 and is inputed to the CPU 14 to reset the CPU 14. In addition, the flip-flop 2 is set, upon receipt of the initializing signal 50, to output the test mode operate signal 102. The NAND circuit 5 receives the test mode operate signal 102 and the clock signal CLK and outputs a signal to the timer 6. The timer 6 begins counting in response to the input signal from the NAND circuit 5. At this point of time, the test operate mode signal 102 is received by the switch circuit SW and the switch circuit SW selects the test program memory 11. Accordingly, the operation mode is set to the test mode. The CPU 14 operates under the control of the program stored in the test program memory 11.

Figure 6:
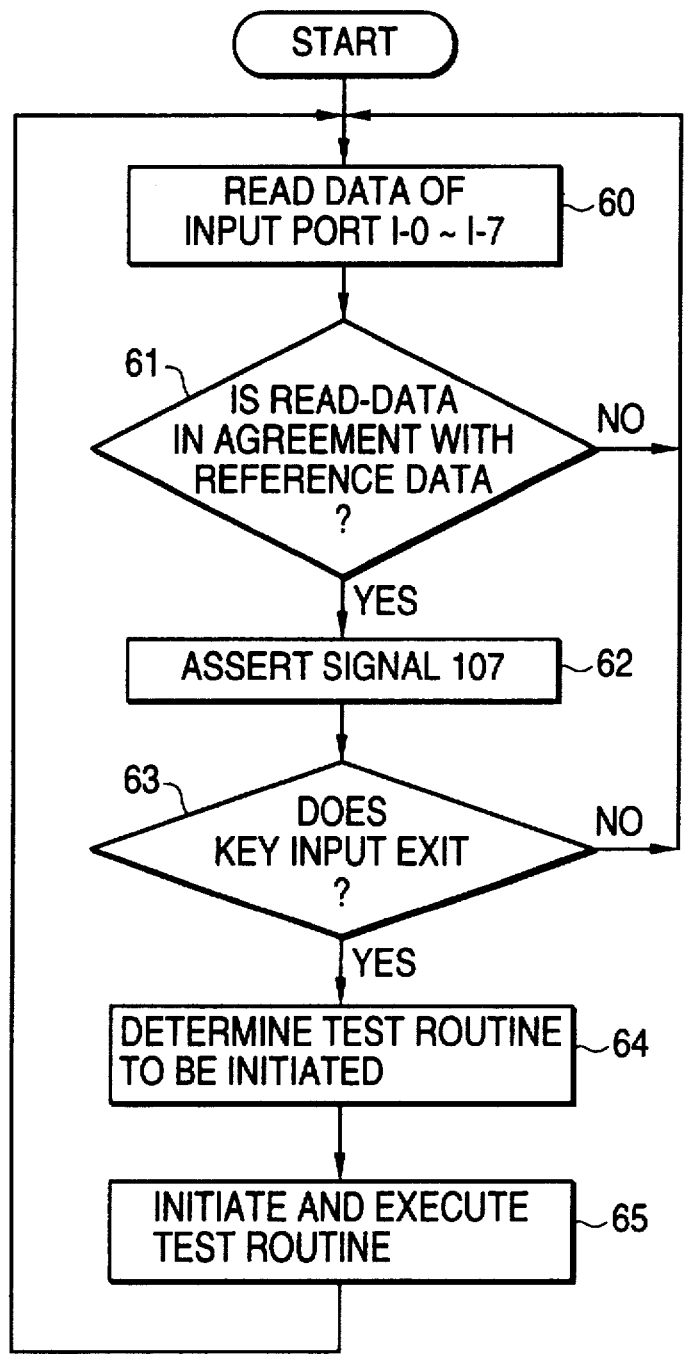
FIG. 6 is a flow chart for the test operate mode according to a first embodiment of the present invention.

The movement by the program stored in the test program memory 11 will be explained with the reference to the timing chart shown in FIG. 6. In step 60, the CPU 14 reads the data of the input port I-0 through I-7. If the read-data is not in agreement with the reference data, move to step 60 and if the read-data is in agreement with the reference data, move to step 62. The CPU 14 outputs the test mode request signal 107, and the timer 6 is reset via the NOR circuit 15. The test operate mode is maintained. In step 63, the CPU 14 examines whether a key input exits. The key input signal indicates whether the test produces actually. If the key input signal is not received, move to the step 60. If the key input signal is received, move to the step 64. In the step 64, the CPU 14 determines the test routine to be initiated. The test program has a plurality of test routines such as a test of the information processing apparatus 200 itself, a test of function between the apparatus 200 and each peripheral in set including the apparatus 200. This is, the CPU 14 needs to select one routine to be executed from among a plurality of routines. In step 65, the CPU 14 initiates and executes the selected test routine and returns to step 60. Returning to the step 61, if the CPU 14 does not produce data which is in agreement with reference data within a predetermined period of time, the CPU 14 outputs the overflow signal 104. The flip-flop 2 is reset upon the overflow signal 104 to cancel the test operate mode. Here, the internal resetting signal 103 is outputted to initialize the internal circuit. The flip-flop 2 does not output the test operate mode signal 102, accordingly, the test operate mode is canceled and switches to the user program memory 10. Since the flip-flop 2 is reset by the overflow signal 104, the system never switches to the test operate mode even in cases where the CPU 14 outputs a test operate mode request signal 107 thereafter for maintenance of the test operate mode. The period of time during which the test operate mode may be set as desired by persons who utilize the test operate mode such as an inspector of the information processing apparatus. If the test operate mode continues, reference data being in agreement with read- data must be generated in reference data generator 17 and be inputed to input ports I-0 through I-7 before the timer 6 outputs the overflow signal 104, and the processing routine must be completed well before the timer 6 outputs the overflow signal 104.

In the user operate mode, input port I-0 through I-7 and I/O ports U-0 through U-7 are connected to user system 19. Accordingly, the power source is supplied to the power supply terminal 21 and the information processing apparatus starts. The information processing apparatus selects the test program memory 11 and the CPU 14 executes the program routine of the test program memory 11 the same as the above mentioned. Since the input port 14 is not connected to the reference data generator 17, read data is not coincident with the reference data in the step 61. Therefore, the CPU 14 does not output the test operate mode request signal 107, timer 6 outputs the overflow signal 104 after a predetermined period of time and the user program memory 10 is selected. As explained above, when the apparatus 200 is used in the user operate mode, the user program memory 10 is selected without executing the test routine of the test program memory 11.

In the test operate mode, the user system 19 uses only I/O ports U-0 through U-7. However, since the test operate mode is a function test of the apparatus 200, the user system 19 does not need to use all of the ports on the test operate mode.

Figure 7:
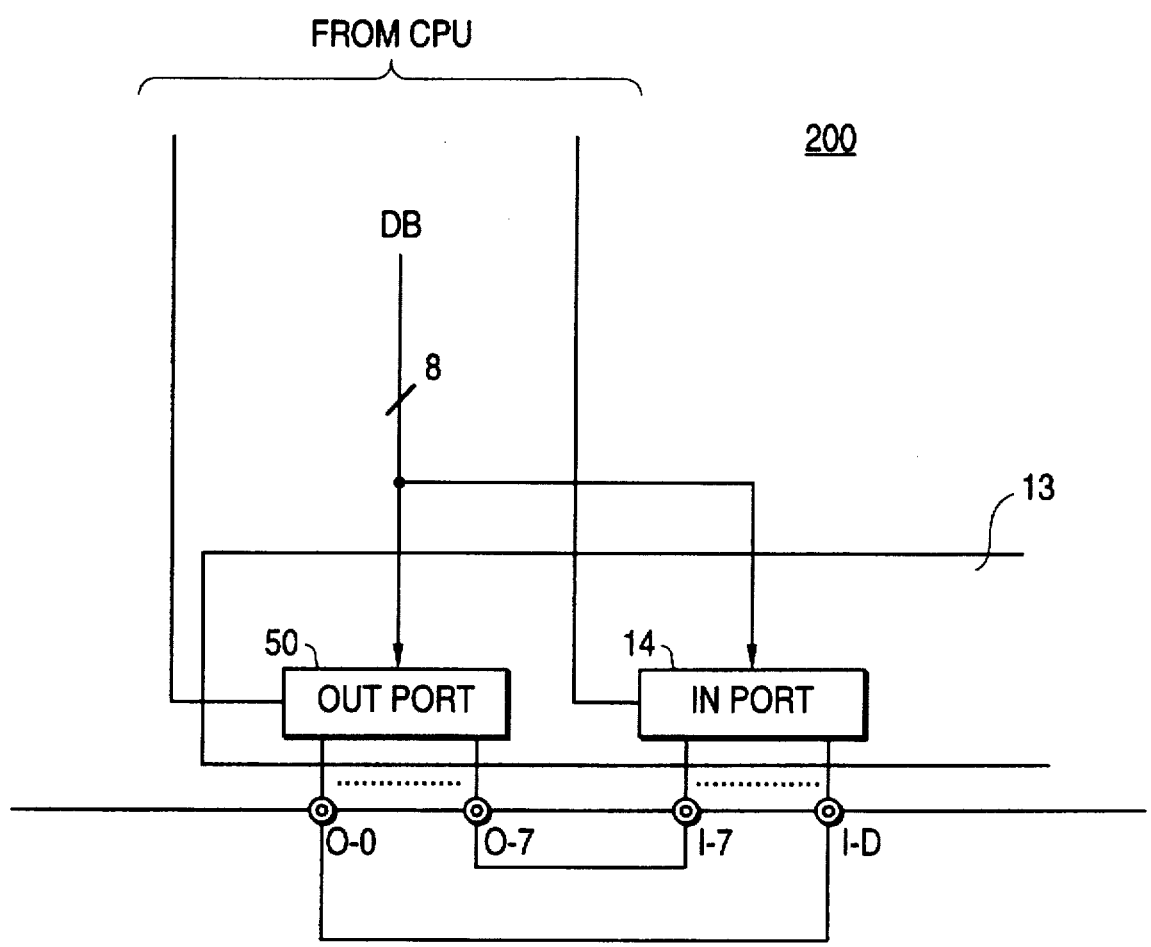
FIG. 7 is a circuit diagram illustrative of an information processing apparatus according to a second embodiment of the present invention.

FIG. 7 is a circuit diagram of an information processing apparatus according to a second embodiment of the present invention.

In contrast to the first embodiment of the present invention, the peripheral circuit 13 has the input port 14 and an output port 50 and the output port 50 is connected to output terminals O-0 through O-7. The input terminals I-0,I-7 and the output terminals O-0 through O-7 are connected respectively to each other by address from the CPU 14. The test program memory 11 further stores the step writing reference data of output ports O-0 through O-7 before the step 60 in FIG. 6. The power source is supplied to the terminal 21 and the information processing apparatus executes by following the program of the test program memory 11. The CPU 14 writes reference data in output ports 0-0 through 0-7. When the test operate mode continues, the CPU 14 connects the output port 50 to the input port 14 by address. Accordingly, a read data from input port 14 is coincident with a reference data to output port 50. When the test operate mode terminates, the CPU 14 does not connect output port 50 to the input port 14 by address.

As above mentioned, the information processing apparatus does not have an external mode terminal. Therefore, the information processing apparatus does not change to an incorrect mode on power since the noise does not input from the external mode terminal. Moreover, the apparatus has the effect of preventing erroneous maintenance of the test operate mode and even of accidental switching to the test operate mode during actual operation in the user operate mode. Under the control of the program stored in the test operate memory, the test operate mode automatically switches the user mode in the event of non-execution of the procedures describing maintenance of the test operate mode.

The information processing apparatus according to the second embodiment of the present invention does not need the reference data generator.

Although the preferred embodiments of the present invention have been described in detail, it should be understood that various changes, substitutions and alterations can be made therein without departing from the spirit and scope of the invention as define by the appended claims. For example, the memory 10,11 does not need to be separate physically. A single memory may be therefor used for storing the test operate routines and the user operate routine by address.

What is claimed is:

1. An information processing apparatus comprising:

a mode setting circuit for setting said information processing apparatus to a test operate mode at power-on, and a circuit for maintaining said test operate mode when read data is in agreement with reference data, and for switching from said test operate mode to a user operate mode when said read data is not in agreement with said reference data.

2. An information processing apparatus including a mode setting circuits, comprising:

a power on clear circuit for outputing an initializing signal at power on;

a flip-flop for outputing a test operate mode setting signal in response to said initializing signal and for outputing a test operate mode resetting signal in response to an overflow signal;

a switch for selecting a test operate mode in response to said test operate mode setting signal and for selecting a user operate mode in response to said test operate mode resetting signal;

a timer for operating in response to said test operate mode setting signal and for outputing said test operate mode canceling signal in the absence of a test operate mode maintenance request signal over a predetermined period of time; and means for outputing said test operate mode maintenance request signal where read data from an imput port is in agreement with reference data.

3. The information processing apparatus as claimed in claim 2, further comprising:

a first gate for producing an internal reset signal in response to at least one of said initializing signal and said overflow signal; and a second gate for resetting said timer in response to at least one of said internal reset signal and said test mode operate maintenance request signal.

* * * * *